US009185328B2

(12) United States Patent
Jang

(10) Patent No.: US 9,185,328 B2
(45) Date of Patent: Nov. 10, 2015

(54) DEVICE AND METHOD FOR DISPLAYING A THREE-DIMENSIONAL PIP IMAGE

(75) Inventor: Jun-yeoung Jang, Seoul (KR)

(73) Assignee: LG Electronics Inc., Seoul (KR)

(*) Notice: Subject to any disclaimer, the term of this patent is extended or adjusted under 35 U.S.C. 154(b) by 803 days.

(21) Appl. No.: 13/376,654

(22) PCT Filed: May 17, 2010

(86) PCT No.: PCT/KR2010/003100
§ 371 (c)(1),
(2), (4) Date: Dec. 7, 2011

(87) PCT Pub. No.: WO2010/143820
PCT Pub. Date: Dec. 16, 2010

(65) Prior Publication Data
US 2012/0081515 A1    Apr. 5, 2012

Related U.S. Application Data

(60) Provisional application No. 61/184,849, filed on Jun. 8, 2009.

(51) Int. Cl.
H04N 13/04        (2006.01)
H04N 5/93         (2006.01)
(Continued)

(52) U.S. Cl.
CPC .............. *H04N 5/45* (2013.01); *H04N 13/0029* (2013.01); *H04N 13/0055* (2013.01);
(Continued)

(58) Field of Classification Search
CPC . H04N 5/45; H04N 13/0029; H04N 13/0055; H04N 13/0059; H04N 13/0066; H04N 13/0456; H04N 19/00769; H04N 21/4316; H04N 21/44
See application file for complete search history.

(56) References Cited

U.S. PATENT DOCUMENTS

2005/0019015 A1    1/2005  Ackley et al.
2007/0247477 A1*   10/2007 Lowry et al. ............ 345/629
(Continued)

FOREIGN PATENT DOCUMENTS

KR   10-2000-0058837     10/2000
KR   10-2007-0022892     2/2009
WO   WO 2009/031872 A2   3/2009

OTHER PUBLICATIONS

International Search Report issued in PCT Application No. PCT/KR2010/003100 dated Dec. 21, 2010.
(Continued)

*Primary Examiner* — Anner Holder
*Assistant Examiner* — Jill Sechser
(74) *Attorney, Agent, or Firm* — KED & Associates LLP

(57) ABSTRACT

Provided are a device and method for providing a three-dimensional PIP image, for combining and outputting a main image with a PIP image. A device for providing a three-dimensional PIP image according to one embodiment of the present invention comprises: an image acquisition unit for acquiring a main three-dimensional image and a two-dimensional or three-dimensional PIP image from a broadcast signal, external device, or recording medium; a PIP-combining unit for combining the main image and the PIP image; and a three-dimensional formatter for formatting the combined image of the main image and the PIP image into a format that can be stereoscopically displayed. Accordingly, an image may be provided with a main three-dimensional image and a two-dimensional PIP image or a main three-dimensional image and a three-dimensional PIP image which are overlaid.

19 Claims, 11 Drawing Sheets

(51) Int. Cl.
    H04N 13/00    (2006.01)
    H04N 5/45     (2011.01)
    H04N 19/597   (2014.01)
    H04N 21/44    (2011.01)
    H04N 21/431   (2011.01)

(52) U.S. Cl.
    CPC ...... *H04N 13/0059* (2013.01); *H04N 13/0066* (2013.01); *H04N 13/0456* (2013.01); *H04N 19/00769* (2013.01); *H04N 21/4316* (2013.01); *H04N 21/44* (2013.01)

(56) References Cited

U.S. PATENT DOCUMENTS

| | | | | |
|---|---|---|---|---|
| 2008/0063369 | A1* | 3/2008 | Kim et al. | 386/95 |
| 2009/0208189 | A1* | 8/2009 | Sasaki et al. | 386/125 |
| 2010/0103318 | A1* | 4/2010 | Wang et al. | 348/565 |
| 2010/0201879 | A1* | 8/2010 | VanDuyn et al. | 348/565 |
| 2010/0303442 | A1* | 12/2010 | Newton et al. | 386/241 |
| 2010/0310155 | A1* | 12/2010 | Newton et al. | 382/154 |
| 2011/0050853 | A1* | 3/2011 | Zhang et al. | 348/44 |

OTHER PUBLICATIONS

Lee, Hyun et al.; "A Structure for 2D/3D Mixed Service Based on Terrestrial DMB System"; Institute of Electrical and Electronics Engineers, 2007 3DTV Conference, Kos, Greece, May 7-9, 2007; pp. 1-4 (XP031158177).

Bolio, D.D.R.J.: "Integration of 3D Video into the Blu-Ray Format"; Master Thesis; Technische Universiteit Eindhoven, Department of Mathematics and Computer Science; Netherlands; Oct. 29, 2007; pp. i-108; Retrieved from the Internet:<<http://alexandria.tue.nl/extral/afstversl/wsk-i/bolio2007.pdf>> (XP008148221).

European Search Report dated Sep. 12, 2013 issued in Application No. 10 78 6303.

* cited by examiner

FIG. 5

| Syntax | No. of bits | Mnemonic |
|---|---|---|
| index.bdmv { | | |
|     type_indicator | 8*4 | bslbf |
|     version_number | 8*4 | bslbf |
|     Indexes_start_address | 32 | uimsbf |
|     ExtensionData_start_address | 32 | uimsbf |
|     Reserved_for_future_use | 192 | bslbf |
|     AppInfoBDMV 0 | | |
|     for (i=0; i<N1; i++) { | | |
|         padding_word | 16 | bslbf |
|     } | | |
|     Indexes 0 | | |
|     for (i=0; i<N2; i++) { | | |
|         padding_word | 16 | bslbf |
|     } | | |
|     ExtenstionData 0 | | |
|     for (i=0; i<N3; i++) { | | |
|         padding_word | 16 | bslbf |
|     } | | |
| } | | |

FIG. 6

| Syntax | No. of bits | Mnemonic |
|---|---|---|
| ExtensionData 0 { | | |
|     length | 32 | uimsbf |
|     if (length!=0) { | | |
|         data_block_start_address | 32 | uimsbf |
|         reserved_for_word_align | 24 | bslbf |
|         number_of_ext_data_entries | 8 | uimsbf |
|     for (i=0; i<number_of_ext_data_entries; i++) { | | |
|         ext_data_entry 0 { | | |
|         ID1 | 16 | uimsbf |
|         ID2 | 16 | uimsbf |
|         ext_data_start_address | 32 | uimsbf |
|         ext_data_length | 32 | uimsbf |
|         } | | |
|     } | | |
|     for (i=0; i<L1; i++) { | | |
|         padding_word | 16 | bslbf |
|         padding_word | 16 | bslbf |
|     } | | |
|     data_block 0 | 32+ 8*(length-data_block_start_address) | |
|     } | | |
| } | | |

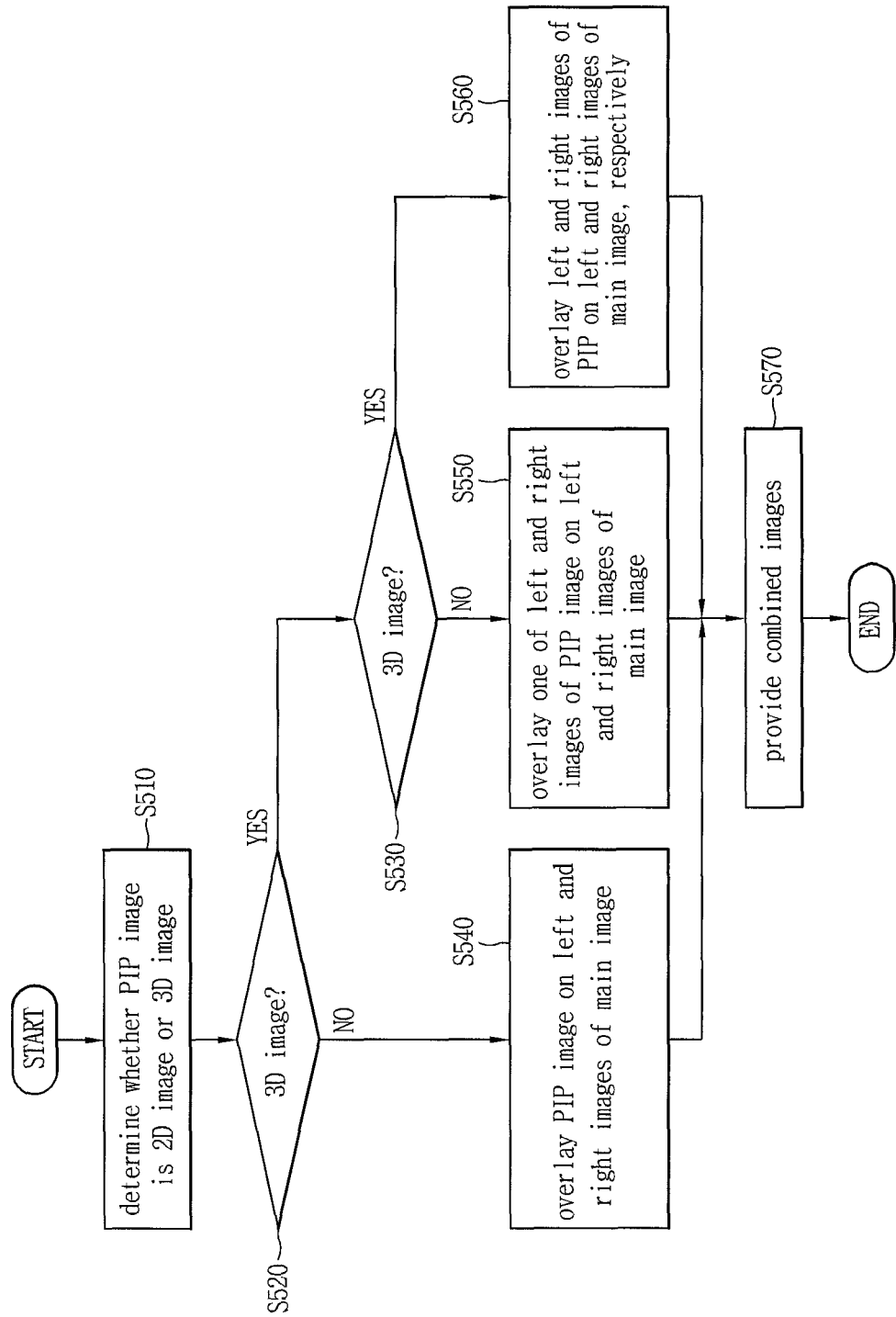

DEVICE AND METHOD FOR DISPLAYING A THREE-DIMENSIONAL PIP IMAGE

TECHNICAL FIELD

The present invention relates to a device and method for providing a three-dimensional image and, more particularly, to a device and method for providing a three-dimensional picture-in-picture (PIP) image.

BACKGROUND ART

In general, a related art stereoscopic three-dimensional (3D) display device provides 3D images allowing for a depth perception or stereovision to users.

DISCLOSURE

Technical Problem

The first technical issue of the present invention is to provide a device and method for providing a 3D PIP image providing a 2D or 3D PIP image along with a 3D main image.

The second technical issue of the present invention is to provide a method for determining a 3D PIP image capable of determining whether or not image content includes a 2D PIP image or a 3D PIP image.

The third technical issue of the present invention is to provide a method for encoding and decoding an image capable of enhancing image encoding and decoding efficiency in a main image and PIP image reference scheme.

Technical Solution

In order to solve the first technical issue of the present invention, a device for providing a three-dimensional (3D) picture-in-picture (PIP) image according to an embodiment of the present invention includes: an image acquisition unit configured to acquire a 3D main image and a 2D or 3D PIP image from a broadcast signal, an external device, or a recording medium; a PIP combining unit configured to combine the main image and the PIP image; and a 3D formatter configured to format the combined image of the main image and the PIP image into a format that can be stereoscopically displayed.

The main image and the PIP image may be included in a single media file according to multi-view video coding.

The main image and the PIP image may be different programs included in a single transport stream.

The PIP combining unit may combine a left image and a right image of the 3D PIP image to a left image and a right image of the 3D main image, respectively.

The PIP combining unit may combine any one of the left image and the right image of the 3D PIP image to a left image and right image of the 3D main image.

The PIP combining unit may combine the 2D PIP image into the left image and the right image of the 3D main image.

The PIP combining unit may include a frame time comparing unit configured to analyze a time relationship between the main image and the PIP image from time information of the two images; and a frame correction unit configured to combine the main image and the PIP image temporally corresponding to the main image.

The 3D formatter may include: a frame time comparing unit configured to analyze a time relationship between two images from time information of a left image and a right image constituting an combined image of the main image and the PIP image; and a frame correction unit configured to synchronize the left image and the right image temporally corresponding to the left image.

The device for providing a 3D PIP image may further include: a PIP image determining unit configured to read configuration information included in the broadcast signal, configuration information provided from the external device, and configuration information stored in the recording medium, and determine whether or not the PIP image is a 3D image or a 2D image.

The device for providing a 3D PIP image may further include: a user input unit configured to receive whether to display the 3D PIP image as a 3D image or a 2D image.

The device for providing a 3D PIP image may further include: an output interface unit configured to output the combined image of the main image and the PIP image to a 3D image display device.

The device for providing a 3D PIP image may further include: a display unit configured to display the combined image of the main image and the PIP image in a stereoscopic manner.

In order to solve the second technical issue of the present invention, a device for providing a three-dimensional (3D) picture-in-picture (PIP) image according to another embodiment of the present invention includes: an optical drive configured to read a transport stream stored in a 3D Blu-ray disk; a transport stream analyzing unit configured to demultiplex a main image program included in the transport stream and a PIP image program, and decode a video bit stream and an audio bit stream of the main image and the PIP image; a PIP combining unit configured to overlay the main image and the PIP image into a single combined image; a 3D formatter configured to format the combined image into a format that can be stereoscopically displayed; and an output interface unit configured to output the formatted combined image to a 3D image display device.

The main image and the PIP image may be stored in the form of a single media file in the 3D Blu-ray disk according to multi-view video coding.

The PIP combining unit may combine a left image and a right image of a 3D PIP image to a left image and a right image of a 3D main image, respectively, combine any one of the left image and the right image of the 3D PIP image to the left image and the right image of the 3D main image, or combine a 2D PIP image to the left image and the right image of the 3D main image.

In order to solve the third technical issue of the foregoing present invention, a method for providing a three-dimensional (3D) picture-in-picture (PIP) image according to an embodiment of the present invention includes: determining whether a PIP image is a 2D image or a 3D image; when the PIP image is a 3D image, determining whether a user has selected a 2D PIP or a 3D PIP; combining a left image and a right image of a 3D PIP image to a left image and a right image of a 3D main image, respectively, combining any one of the left image and the right image of the 3D PIP image to the left image and the right image of the 3D main image, or combining a 2D PIP image to the left image and the right image of the 3D main image; and providing the combined image of the main image and the PIP image to a 3D image display device.

In order to solve the second technical problem of the foregoing present invention, a method for determining a three-dimensional (3D) picture-in-picture (PIP) image according to an embodiment of the present invention includes: reading a database file stored in a 3D Blu-ray disk; reading PIP image information included in the database file; and determining whether a PIP image is a 3D image or a 2D image based on the PIP image information.

The database file may be an "index.bdmv" file, and the PIP image information may be stored in an "ExtensionData" region or a "reserved_for_future_use" region.

In order to solve the third technical problem of the foregoing present invention, an image encoding and decoding reference method includes: designating such that any one image frame constituting a 3D main image refers to at least one different image frame constituting the 3D main image; designating such that any one image frame constituting a PIP image refers to at least one different image frame constituting the PIP image; and encoding or decoding the 3D main image and the PIP image, wherein the image frame constituting the 3D main image does not refer to an image frame constituting the PIP image and an image frame constituting the PIP image does not refer to an image frame constituting the 3D main image.

The main image and the PIP image may be stored in the form of a single media file according to multi-view video coding.

Advantageous Effects

According to the present invention device and method for providing a three-dimensional (3D) picture-in-picture (PIP) image as described above, an image acquired by overlaying a 3D main image and a 2D PIP image or an image acquired by overlaying a 3D main image and a 3D PIP image can be provided.

Also, according to the present invention method for determining a 3D PIP image, whether a 2D PIP image or a 3D PIP image is included in image content may be determined by using information stored in a certain region of a configuration file.

In addition, according to the image encoding reference method of the present invention, 3D image encoding and decoding efficiency can be enhanced by preventing a main image and a PIP image existing in a single multi-view video coding file from referring to each other.

DESCRIPTION OF DRAWINGS

FIG. 5 is an exemplary view explaining an example of a structure of an "index.bdmv" file stored in a 3D Blu-ray disc.

FIG. 6 is an exemplary view explaining an example of a structure of "ExtensionData" in a configuration of the "index.bdmv" file stored in the 3D Blu-ray disc.

FIG. 12 is a flow chart illustrating a method for providing a 3D PIP image according to an embodiment of the present invention.

BEST MODES

Figure 1:
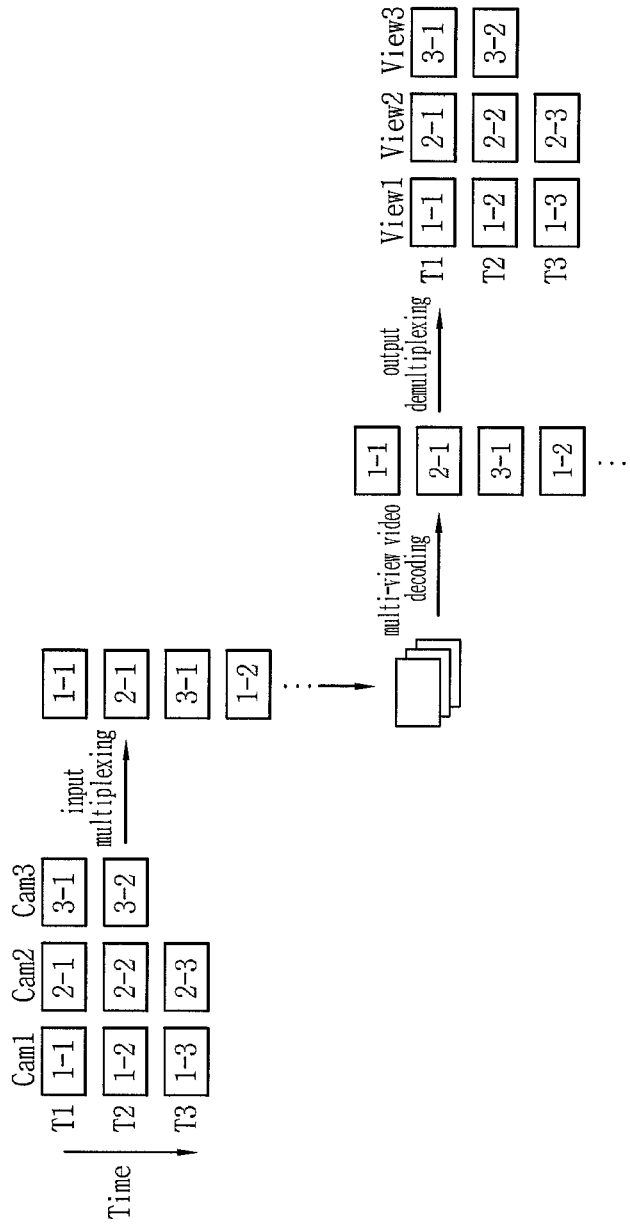
FIG. 1 is a conceptual view explaining multi-view video coding.

Embodiments of an image encoding and decoding reference method capable of enhancing image encoding and decoding efficiency of a three-dimensional (3D) main image and a two-dimensional (2D) or 3D picture-in-picture (PIP) image, a method for determining a 3D PIP image capable of determining whether or not a 2D PIP image or a 3D PIP image is included in image content, and a device and method for providing a 3D PIP image capable of providing an image acquired by overlaying a 3D main image and a 2D PIP image, or a 3D main image and a 3D PIP image will be described in detail with reference to FIGS. 1 through 12.

First, concepts or terms required to explain embodiments of the present invention will be described.

Configuration of Stereoscopic Image

A stereoscopic image is composed of a left image (or an image for the left eye image) and a right image (or an image for the right eye). Schemes for configuring a stereoscopic image include a top-down scheme in which the left image and the right image are disposed in a top-down manner in one frame, an L-to-R (left-to-right or side-by-side) scheme in which the left image and the right image are disposed horizontally in one frame, a checker board scheme in which fragments of the left image and the right image are disposed in a tile form, an interlaced scheme in which the left image and the right image are alternately disposed by column or row, and a time sequential (or frame-by-frame) scheme in which the left image and the right image are alternately displayed according to time. Thus, one stereoscopic scene (image) includes two frames in case of the time sequential scheme and one frame in case of schemes other than the time sequential scheme.

Multi-View Video Coding

A multi-view video refers to images captured from various viewpoints (or views) during the same time period through one or more cameras, whereby a user can be provided with images of various viewpoints.

A multi-view video system acquires multi-view images captured by using several cameras, corrects the captured images by using geographical features of the cameras, and transmits the corrected images after encoding. A receiver reproduces combined images by using the spatial features of each image in the form of stereoscopic 3D images via a 3D display device or a multi-view stereoscopic display device. The viewer may view images from any desired viewpoint by using the multi-view video system, and by combining images from an intermediate viewpoint, a variety of images can be viewed.

In the multi-view video processing technique, since images are received through several cameras, multi-view video processing technique has unique characteristics in image acquiring, image processing and coding, image displaying, and the like. In particular, in multi-view video coding (MVC), removal of redundancy between images greatly affects compression efficiency, and this is because, in case of multi-view images, since images are captured at different positions during the same time slot, the images have spatial redundancy.

FIG. 1 is a conceptual view explaining multi-view video coding.

As shown in FIG. 1, in multi-view video coding, a single object or scene is captured at the same time slots T1, T2, T3 by using several cameras Cam1, Cam2, Cam3 to acquire video frames 1-1, 2-1, 3-1, 1-2, 2-2, 3-2, 1-3, 2-3, and the acquired video frames are multiplexed into a single video stream, encoded by using a multi-view video encoding method, and then stored or transmitted. In case of reproducing the video stream, the video stream is restored by using a multi-video video decoding method and then demultiplexed to acquire the image frames 1-1, 2-1, 3-1, 1-2, 2-2, 3-2, 1-3, 2-3 for respective camera views View1, View2, View3. For example, the multi-view video encoding method and the multi-view video decoding method may be based on the H.265/AVC standard.

A scheme of making a cross-reference between image frames in multi-vide video coding is as follows. In a multi-view video, there is a video stream for each view, and image encoding and decoding is performed by making a cross-reference between temporally preceding and subsequent frames in the respective video streams as well as making a cross-reference between frames of the same of close time slots among video streams each having a different view. The reason is because, as mentioned above, in the case of multi-view images, since the images are captured at different positions adjacent at the same time slot, there is high redundancy or relevancy between the images.

Meanwhile, as mentioned above, a 3D image is comprised of a left image and a right image, and unless the screen resolution of the left image and the right image is lowered to be a half or less, the 3D image requires more storage space or transmission capacity than that of an existing image. In particular, when a time-division scheme is adopted to maintain screen resolution, a minimum of a double storage space or transmission capacity is required. Also, in case of supporting a PIP, a supplementary space is required.

The foregoing multi-view video coding (MVC) technique may be used to generate, store, and transmit a 3D image. In this case, a left image and a right image of a main image may be stored as a single MVC file in a recording medium, and a PIP image may be stored as a separate MVC file or may be stored as a single MVC file along with the main image. Namely, when the multi-view video coding technique is used to generate, store, and transmit a 3D image, a PIP image (a left image and a right image in case of a 3D PIP image) and a left image and a right image constituting a 3D main image may be handled and processed as images acquired from different views.

In particular, storing the main image and the PIP image in a single MVC file is desirable in that a synchronization issue in reproducing the main image and the PIP image is reduced. That is, when the main image and the PIP image are stored as separate MVC files, synchronization information between the main image and the PIP image must be separately maintained and managed, making it difficult to combine the main image and the PIP image.

Hereinafter, for the sake of simplified explanation, the case in which the main image and the PIP image are stored in a single MVC file will be described. However, the configuration of storing a main image and a PIP image in a single MVC file merely is merely aimed at explaining an embodiment of the present invention and it will be appreciated that the technical concepts of the present invention are not limited thereto. For example, as mentioned above, the present invention can be also applicable to a case in which the main image and the PIP image are stored in separate MVC files, and in this case, a unit for synchronizing reproducing of the main image and reproducing of the PIP image may be additionally provided.

Hereinafter, an image encoding and decoding reference method capable of enhancing image encoding and decoding efficiency of a 3D main image and a 2D or 3D PIP image will be described.

As discussed above, in the multi-view video coding, image encoding and decoding efficiency is enhanced by making a cross-reference between video streams each having a different view. However, such a reference relationship is not advantageous for a 3D main image and a PIP image. Namely, making a cross-reference between a left image and a right image in a 3D main image or a 3D PIP image or making a cross-reference between image frames having a temporal preceding and subsequent relationship in a main image or a PIP image may enhance image encoding and decoding efficiency. However, an image frame of a 3D main image and an image frame of a PIP image have a low relevancy between images, so making a cross-reference between the images does not greatly enhance the image encoding and decoding efficiency. Thus, making a cross-reference is not performed between a 3D main image and a 2D or 3D PIP image, thereby eliminating a reference calculation, and as a result, the speed of image encoding and decoding can be enhanced.

Figure 2:
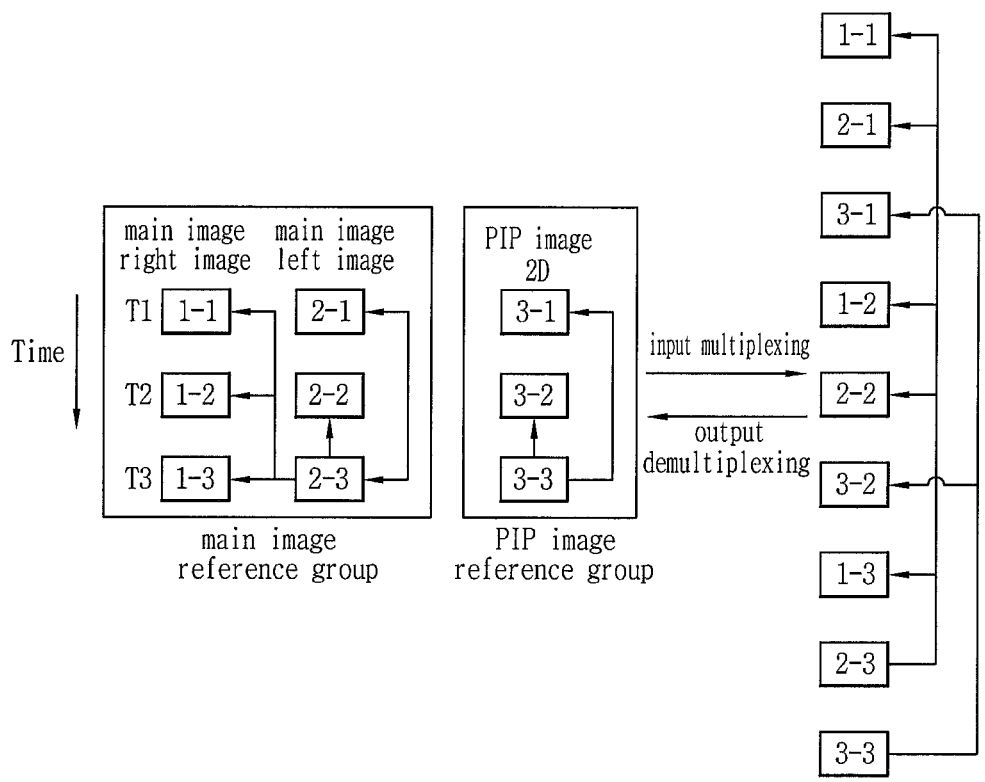
FIG. 2 is a conceptual view explaining a method for referring to a three-dimensional (3D) main image and a two-dimensional (2D) picture-in-picture (PIP) image.
Figure 3:
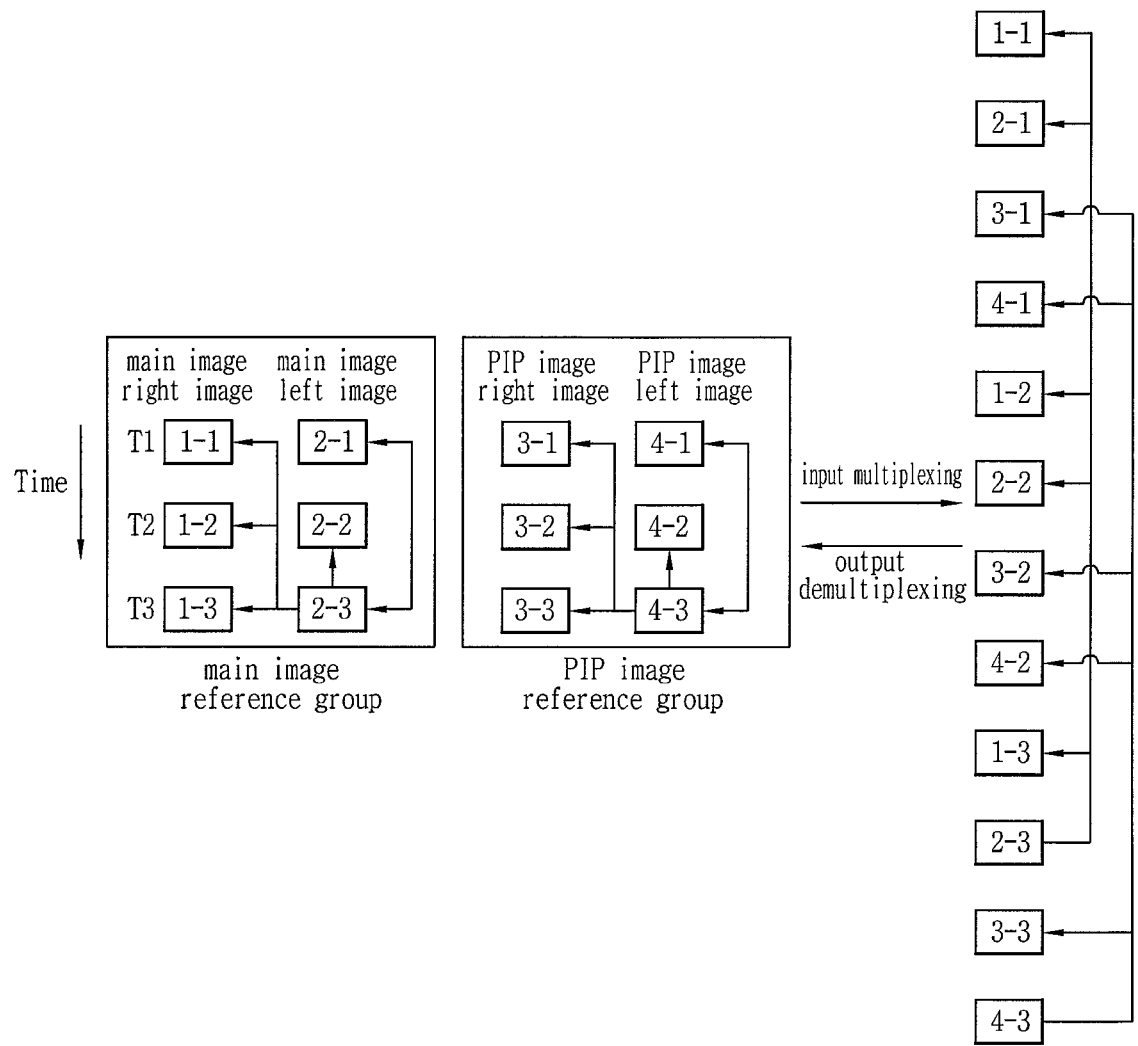
FIG. 3 is a conceptual view explaining a method for referring to a 3D main image and a 3D PIP image.

FIGS. 2 and 3 are conceptual views explaining an image encoding and decoding reference method according to an embodiment of the present invention.

Namely, FIG. 2 is a conceptual view explaining a method for referring to a 3D main image and a 2D PIP image. In FIG. 2, reference subjects of a frame 2-3 of a 3D main image and a frame 3-3 of a 2D PIP image will be described as an example.

As shown in FIG. 2, an image frame 2-3 at a time T3 of a left image of a 3D main image may refer to the same time frame 1-3 and preceding frames 1-1, 1-2 of a right image as well as preceding frames 2-1, 2-2 of the left frame. Similarly, an image frame 3-3 at a time T3 of a 2D PIP image may refer to preceding frames 3-1, 3-2 of the PIP image.

However, the image frame 2-3 of the 3D main image does not refer to an image frame of the 2D PIP image, and similarly, the image frame 3-3 of the 2D PIP image does not refer to an image frame of the 3D main image. Such a reference relationship is maintained in multiplexing into a single video stream or demultiplexing from a single video stream. Namely, multiplexing or demultiplexing is performed in a time domain, but referring to image frames is made internally in respective main image reference group and PIP image reference group.

FIG. 3 is a conceptual view explaining a method for referring to a 3D main image and a 3D PIP image. In FIG. 3, reference subjects of a frame 2-3 of a 3D main image and a frame 4-3 of a 3D PIP image will be described as an example.

As shown in FIG. 3, an image frame 2-3 at a time T3 of the left image of a 3D main image may make reference to, not only the preceding frames 2-1, 2-2 of the left image, but also the same time frame 1-3 of the right image and preceding frames 1-1, 1-2 of the right image. Similarly, an image frame 4-3 at the time T3 of a left image of a 3D PIP image may make reference to, not only the preceding frames 4-1, 4-2 of the left image, but also the same time frame 3-3 of the right image and preceding frames 3-1, 3-2 of the right image.

However, the image frame 2-3 of the 3D main image does not refer to an image frame of the 3D PIP image, and similarly, the image frame 4-3 of the 3D PIP image does not refer to an image frame of the 3D main image. Such a reference relationship is maintained in multiplexing into a single video stream or demultiplexing from a single video stream. Namely, multiplexing or demultiplexing is performed in time domain, but referring to image frames is made internally in respective main image reference group and PIP image reference group.

Hereinafter, a method for determining a 3D PIP image capable of determining whether a 2D PIP image or a 3D PIP image is included in image content will be described.

When a main image and a PIP image are stored in a single MVC file, the number of video streams included in the MVC file is 3 in case in which the PIP image is a 2D image, and is 4 in case in which the PIP image is a 3D image. Information regarding the number of video streams included in the MVC file or whether the PIP image is a 2D image or a 3D image may be stored in a predetermined region of a memory or a recording medium in which the MVC file is stored or in a predetermine region within a configuration file. The information may be previously determined at the time of manufacturing 3D image content and stored in a recording medium, or the like, or a 3D image content reproducing device or display device may read the information to determine a type (2D image or 3D image) of the PIP image.

Hereinafter, for the sake of brevity, a case in which the information is stored in an "index.bdmv" file of a 3D Blu-Ray™ disc will be described as an example. Here, the configuration of using the 3D Blu-Ray™ disc and the "index.bdmv" file merely is merely aimed at explaining an embodiment of the present invention and it will be appreciated that the technical concept of the present invention is not limited thereto. For example, a method for determining a 3D PIP image according to an embodiment of the present invention may be applicable to any recording mediums or memories that are able to store 3D image content, as well as a 3D Blu-Ray™ disc, and the information may be stored in any types of files or recording regions that can be read by a 3D image reproducing device.

Figure 4:
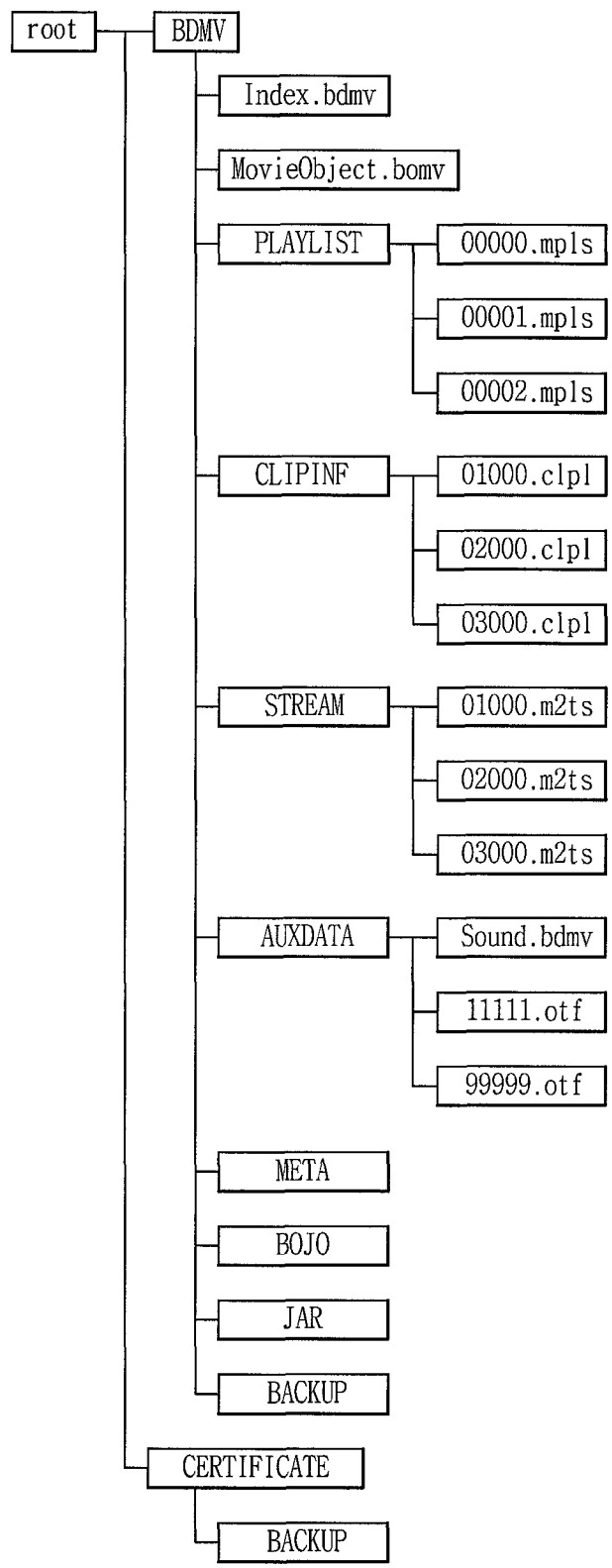
FIG. 4 is an exemplary view explaining an example of a directory structure of a 3D Blu-ray disc.

FIGS. 4 through 6 are exemplary views explaining the structure of a configuration file used for the method for determining a 3D PIP image according to an embodiment of the present invention. Specifically, FIG. 4 is an exemplary view explaining an example of a directory structure of a 3D Blu-Ray™ disc, FIG. 5 is an exemplary view explaining an example of a structure of an "index.bdmv" file stored in a 3D Blu-Ray™ disc, and FIG. 6 is an exemplary view explaining an example of a structure of "ExtensionData" in a configuration of the "index.bdmv" file stored in the 3D Blu-Ray™ disc.

When 3D image content is stored in a recording medium or a memory, information regarding whether a PIP image exists and information regarding whether a PIP image is a 2D image or a 3D image may be stored in an "ExtensionData" region or a "reserved_for_future_u e" region of the "index.bdmv" file. Hereinafter, for the sake of brevity, a case in which information regarding whether a PIP image exists in the "ExtensionData" region and information regarding whether a PIP image is a 2D image or a 3D image are stored will be described as an example. Here, the configuration of using the "ExtensionData" region of the "index-bdmv" file is merely aimed at explaining an embodiment of the present invention and it will be appreciated that the technical concept of the present invention is not limited thereto.

As shown in FIGS. 4 through 6, "ExtensionData" is stored in the "index. bdmv" file of a database file for a 3D Blu-ray disc, and the "index.bdmv" file may be stored in a BDMV folder under a root file system of the 3D Blu-Ray™ disc. For example, the information (i.e., the information regarding whether a PIP image exists, information regarding whether the PIP image is a 2D image or a 3D image, etc.) may be stored in a "data_block" region of "ExtensionData".

A 3D Blu-Ray™ disc player may read offset information at which the "ExtensionData" region starts in an "ExtensionData start_address" field of the "index.bdmv" file, confirm the information stored in the "ExtensionData" region, and perform a 3D image content reproduction operation accordingly.

Figure 7:
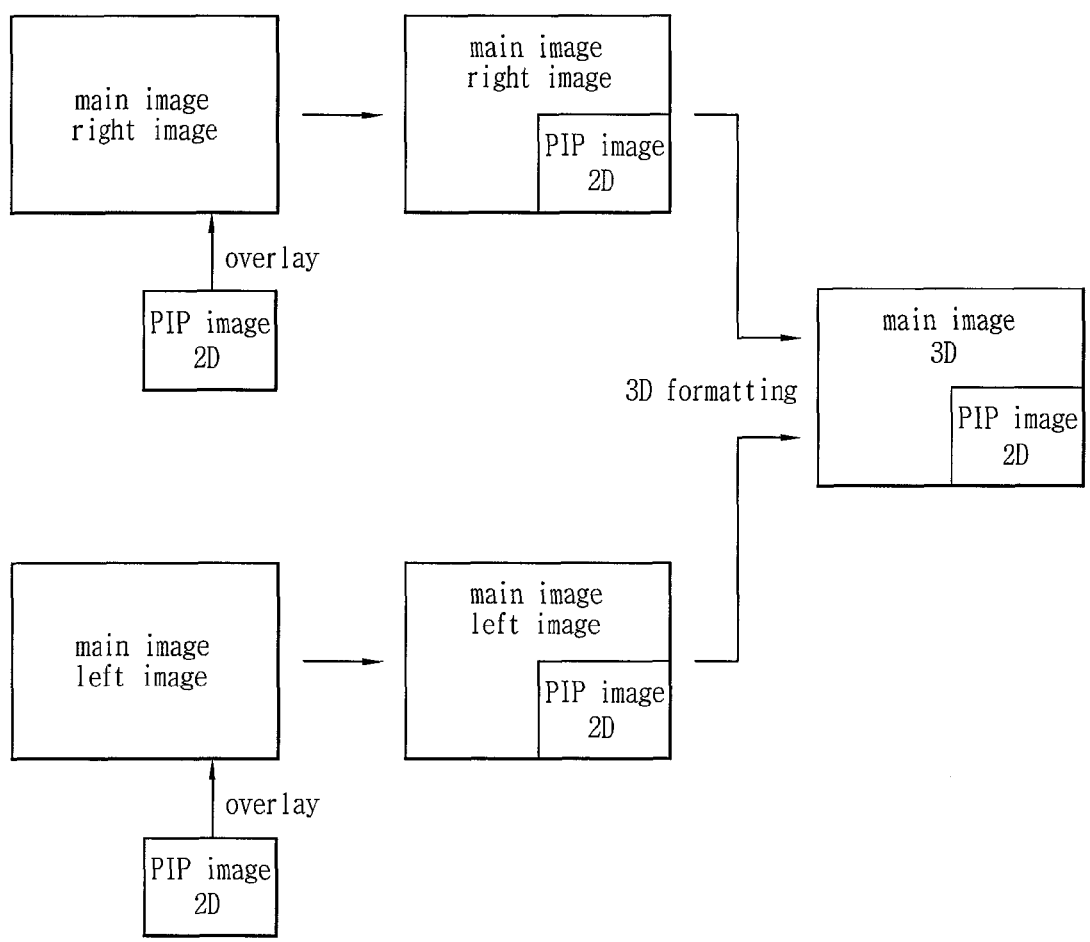
FIG. 7 is a conceptual view explaining overlaying of a 3D main image and a 2D PIP image in a device for providing a 3D PIP image according to an embodiment of the present invention.
Figure 8:
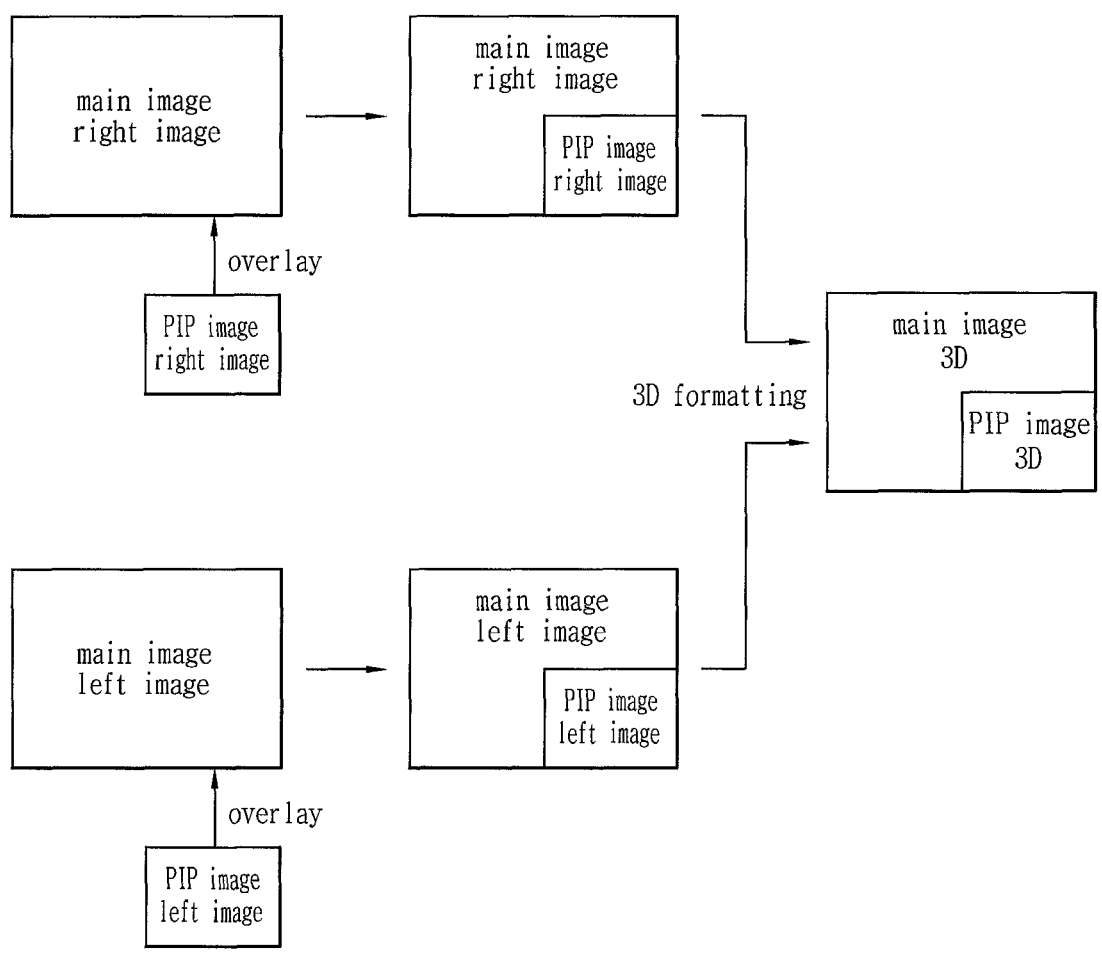
FIG. 8 is a conceptual view explaining overlaying of a 3D main image and a 3D PIP image in a device for providing a 3D PIP image according to an embodiment of the present invention.

FIGS. 7 and 8 are conceptual views explaining overlaying of a main image and a PIP image in a device for providing a 3D PIP image according to an embodiment of the present invention. Specifically, FIG. 7 is a conceptual view explaining overlaying of a 3D main image and a 2D PIP image in a device for providing a 3D PIP image according to an embodiment of the present invention, and FIG. 8 is a conceptual view explaining overlaying of a 3D main image and a 3D PIP image in a device for providing a 3D PIP image according to an embodiment of the present invention. In particular, a method for determining a 3D PIP image according to an embodiment of the present invention as described above may be used as a method for determining whether a PIP image is a 2D image or a 3D image.

Here, overlaying of a main image and a PIP image may be denoted or understood as combining a main image and a PIP image, merging of a main image and a PIP image, rendering for combining a main image and a PIP image, generating of an image by combining a main image and a PIP image, or the like.

When a 2D PIP image is provided (namely, when three video streams are included in an MVC file), or when a 3D PIP image is provided but the user wants to view a 2D PIP image, the device for providing a 3D PIP image according to an embodiment of the present invention may overlay the same 2D PIP image frame in the same regions of a left image frame and a right image frame of a main image or overlay any one of a left image frame or a right image frame constituting a 3D PIP image frame in the same region of a left image frame and a right image frame of a main image. As a result, the main image may be displayed as a 3D image and 2D image is displayed as a PIP image.

With reference to FIG. 7, when a PIP image is a 2D image, the PIP image is overlaid on a left image and a right image of a main image. Such an overlay process may be performed by using video overlay, hardware overlay, or the like, and as a result, a PIP image may be disposed on the main image. The left image and the right image of the main image in which the PIP is overlaid, respectively, may undergo a 3D formatting process to constitute a 3D main image on which the 2D PIP image is overlaid.

When a 3D PIP image is provided (namely, four video streams are included in a MVC file) and the user wants to view a 3D PIP image, the device for providing a 3D PIP according to an embodiment of the present invention may overlay the left image frame and the right image frame of the 3D PIP image frame on the same regions of the left image frame and the right image frame of the main image, respectively. As a result, the main image and the PIP image are displayed as 3D images.

With reference to FIG. 8, when a PIP image is a 3D image, a left image of the PIP image is overlaid on a left image of a main image and a right image of the PIP image is overlaid on a right image of the main image. In a same manner as that of FIG. 7, the left image and the right image of the main image on which the PIP image is overlaid undergoes a 3D formatting process to constitute a 3D min image with the 3D PIP image overlaid thereon.

Figure 9:
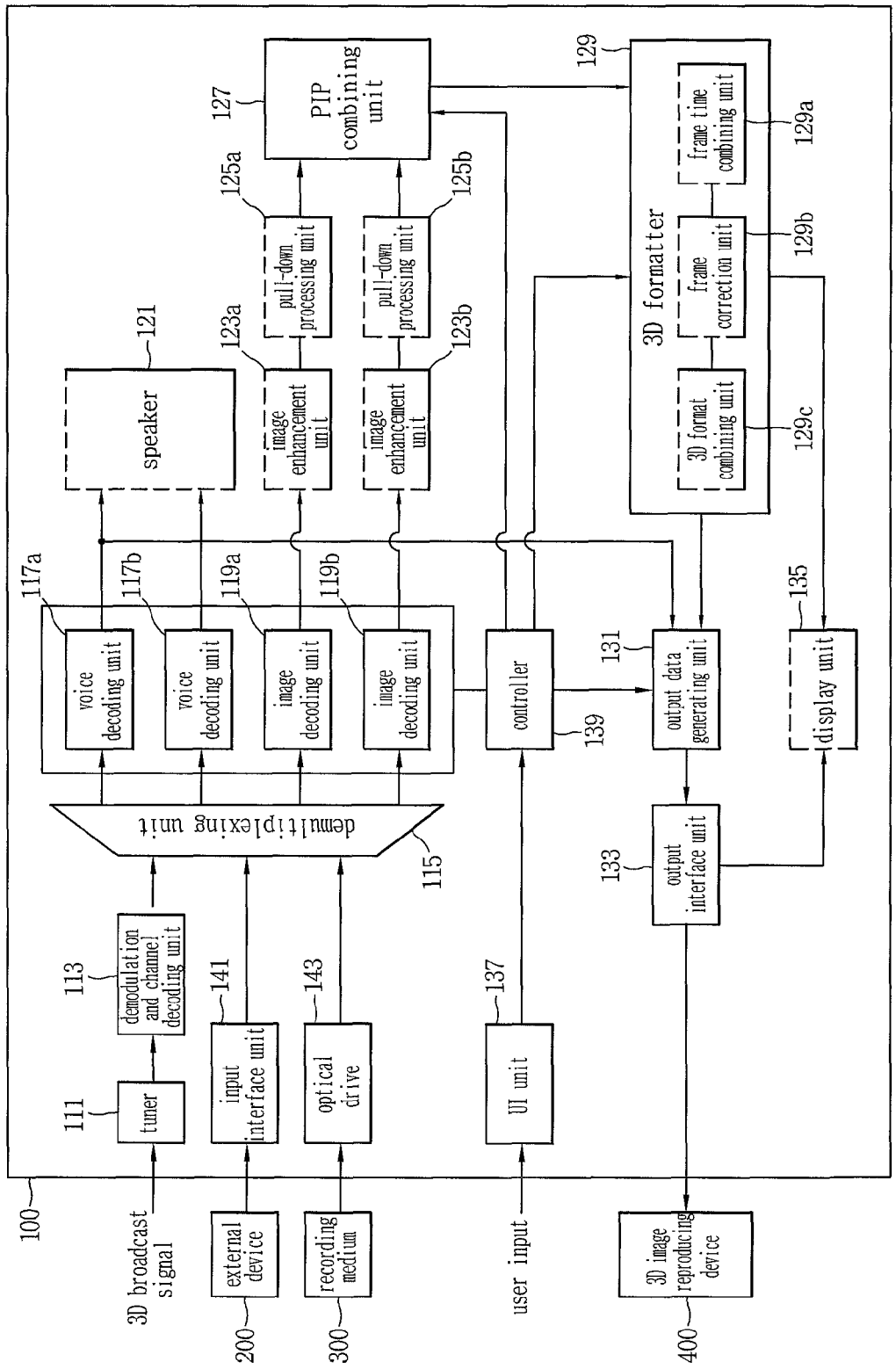
FIGS. 9 through 11 are block diagrams showing the device for providing a 3D PIP image according to an embodiment of the present invention.
Figure 10:
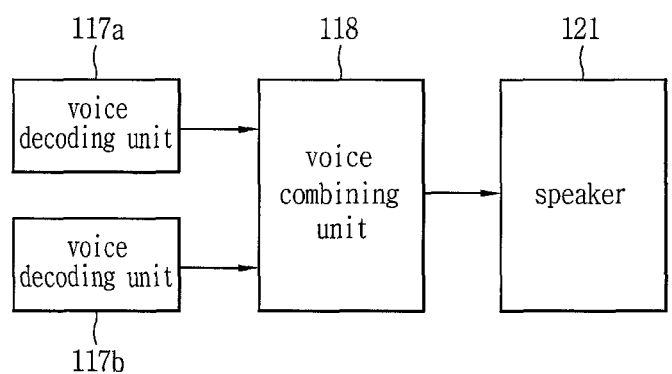
Figure 11:
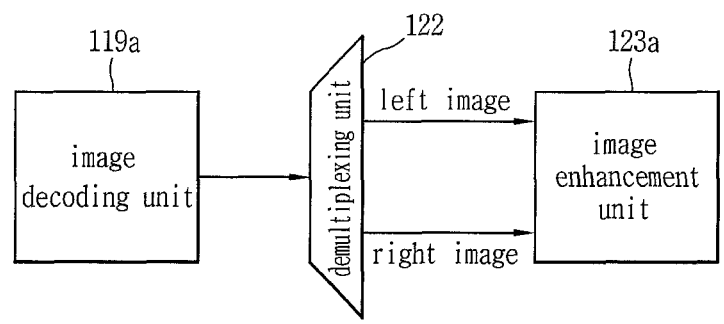

FIGS. 9 through 11 are block diagrams showing the device for providing a 3D PIP image according to an embodiment of the present invention.

Specifically, FIG. 9 is a block diagram showing a configuration of the device for providing a 3D PIP image according to an embodiment of the present invention. The device 100 for providing a 3D PIP image may provide a 3D stereoscopic image from a 3D broadcast signal, 3D image content provided from an external device 200 such as a 3D image set-top box, or the like, and 3D image content stored in a recording medium such as a 3D Blu-ray disc, or the like, and may also provide a 2D PIP image or a 3D PIP image.

The device 100 for providing a 3D PIP image may be implemented in various forms. For example, the device 100 for providing a 3D PIP image may be a 3D Blu-ray disc player, a 3D television, a 3D image set-top box, or the like. For example, the 3D Blu-ray disc player may receive a 3D broadcast signal through a wired/wireless network via terrestrial signals, a cable network, the Internet, mobile communication, satellite communication, or the like, or may be provided with 3D image data from the recording medium 300 such as a 3D Blu-Ray™ disc, or the like, and may output a corresponding 3D stereoscopic image.

As shown in FIG. 9, the device 100 for providing a 3D PIP image may include a tuner 111, a demodulation and channel decoding unit 113, a transport demultiplexing unit 115, voice decoding units 117a, 117b, image decoding units 119a, 119b, a speaker 121, image enhancement units 123a, 123b, pull-down processing units 125a, 125b, a PIP combining unit 127, a 3D formatter 129, an output data generating unit 131, an output interface unit 133, a display unit 135, a UI unit 137, a controller 139, an input interface unit 141, an optical drive 143, and the like. The constituents of the device 100 for providing a 3D PIP image illustrated in FIG. 9 are not all essential; the device 100 for providing a 3D PIP image may be implemented by greater or fewer constituents.

The tuner 111 selectively outputs a broadcast signal of any one channel among a plurality of broadcast signals.

The demodulation and channel decoding unit 113 may demodulate the broadcast signal from the tuner 111 and performs error-correction decoding on the demodulated signal, to output a transport stream (TS). The demodulation and channel decoding unit 113 may include an analog-to-digital converter (ADC0 to output the TS.

Meanwhile, the input interface unit 141 may receive the TS including a main image program and a PIP image program from the external device 200 such as a 3D image set-top box, or the like, and outputs the same to the transport demultiplexing unit 115.

Meanwhile, the optical driver 143 reads the TS including the 3D image program and the PIP image program from the recording medium 300 such as a 3D Blu-ray disk, or the like, and outputs the read TS to the transport demultiplexing unit 15.

The transport demultiplexing unit 115 demultiplexes the TS to split a video packetized elementary stream (PES) and an audio PES. Additionally, the transport demultiplexing unit 115 may extract PSI (program specific information)/PSIP (program and system information protocol) information. A depacketization unit (not shown) may depacketize the video PES and the audio PES to restore a video ES (elementary stream) and an audio stream. The PSI/PSIP processing unit (not shown) receives the PSI/PSIP information from the transport demultiplexing unit 115, parses the received PSI/PSIP information, and stores the parsed information in a memory or a register, so that broadcast signal decoding and broadcast reproduction can be made based on the stored information.

Also, the transport demultiplexing unit 115 may perform filtering and parsing to sort out packets of a program to be reproduced from among programs included in the TS.

Hereinafter, for the sake of explanation, a case in which a main image and a PIP image are stored as a single MVC file in the recording medium 300 and a main image program and a PIP image program are included in a single TS will be described as an example. However, the configuration of storing a main image and a PIP image as a single MVC file in the recording medium 300 and including a main image program and a PIP image program in a single TS is merely aimed at explaining an embodiment of the present invention and it will be appreciated that the technical concept of the present invention is not limited thereto.

For example, as mentioned above, the present invention can be also applicable to a case in which the main image and the PIP image are stored as separate MVC files, and in this case, a unit for synchronizing reproducing of the main image and reproducing of the PIP image may be additionally provided.

Also, for example, the present invention may also be applicable to a case in which a main image and a PIP image are provided in the form of a 3D broadcast signal or 3D image data from the external device 200. This case may be understood that it is similar to the case of using the recording medium 300.

Also, for example, the present invention may also be applicable to a case in which a main image program and a PIP image program are included in separate TSs, and in this case, a plurality of transport demultiplexing units and a plurality of voice/image decoding units may be provided to demultiplex and decode the main image program and the PIP image program, respectively.

With respect to the video ES and the audio ES restored through the demultplexing unit 115 and the depacketization unit (not shown), a video ES and an audio ES corresponding to the main image program and a video ES and an audio ES corresponding to the PIP image program are provided to different voice/image decoding units, respectively. For example, the depacketization unit (not shown) may provide the video ES corresponding to the main image program to the image decoding unit 119a and the video ES corresponding to the PIP image program to the image decoding unit 119b. Also, for example, the depacketization unit (not shown) may provide the audio ES corresponding to the main image program to the voice decoding unit 117a and the audio ES corresponding to the PIP image program to the voice decoding unit 119b.

The video decoding units 117a and 117b may decode the audio ES to output an audio bit stream. The audio bit stream is converted into an analog voice signal by a digital-to-analog converter (not shown), amplified by an amplifier (not shown), and then, output through the speaker 121. Here, as shown in FIG. 10, a voice combining unit 118 may appropriately combine the audio bit stream of the main image program decoded by the voice decoding unit 117a and the audio bit stream of the PIP image program decoded by the voice decoding unit 117b and output the same through the speaker 121.

The image decoding units 119a, 119b may decode the video ES to restore the video bit stream. The restored video bit stream may include a left image signal and a right image signal constituting a 3D main image, a left image signal and a right image signal constituting a 3D PIP image, or a 2D image signal constituting a 2D PIP image. Here, as shown in FIG. 11, the demultiplexing unit 122 splits the video bit stream corresponding to the 3D main image into a left image stream and a right image stream and provide the same to the image enhancement units 123a, 123b. The demultiplexing unit 122 may split the video bit stream corresponding to the 3D PIP image in the same manner and provide the same.

The image enhancement units 123a 123b may perform picture quality enhancement operation such as deinterlacing, image enhancement, or the like, on the video bit stream.

The pull-down processing units 125a, 125b may perform pull-down or telecine operation on the video bit stream. The pull-down or telecine operation refers to an operation of adjusting a screen ratio, or the like, such that an image for theater movie fits a television or a monitor.

The PIP combining unit 127 combines (overlays) the PIP image frame on the main image frame. In detail, when the PIP image is a 2D image, the PIP combining unit 127 may combine the same 2D PIP image frame on the same regions of the left image frame and the right image frame of the main frame. Or, when the PIP image is a 3D image, the PIP combining unit 127 may combine a left image frame and a right image frame of the 3D PIP image frame on the same regions of the left image frame and the right image frame of the main image, respectively.

Also, the PIP combining unit 127 may dispose a PIP image on a main image by using video overlay, hardware overlay, or the like.

Also, the PIP combining unit 127 may combine a main image frame and a PIP image frame which are temporally consistent or synchronized, and to this end, the PIP combining unit 127 may include a frame time comparing unit (not shown) and a frame correction unit (not shown). The frame time comparing unit (not shown) of the PIP combining unit 127 may analyze a time relationship between the main image and the PIP image from time information of the two images, and the frame correction unit (not shown) of the PIP combining unit 127 may synchronize the main image and the PIP image temporally corresponding to the main image. The frame time comparing unit (not shown) and the frame correction unit (not shown) can be understood in a similar manner to a frame time comparing unit 129a and a frame correction unit 129b of the 3D formatter 129 (to be described), so a description thereof will be omitted.

Meanwhile, in order to determine whether a PIP image is a 2D image or a 3D image, the method for determining a 3D PIP image according to an embodiment of the present invention may be used. For example, the PIP combining unit 127 may check information regarding whether a PIP image is a 2D image or a 3D image from a configuration file stored in a Blu-ray disk. Or, for example, although not shown in FIG. 9, the controller 139 or the transport demultiplexing unit 115 may check the information from the configuration file and provide the same to the PIP combining unit 127. In the following description, for the sake of brevity, it is assumed that the PIP combining unit 127 determines whether a PIP image is a 2D image or a 3D image. However, the configuration in which the PIP combining unit 127 performs determination is merely aimed at explaining an embodiment of the present invention and it will be appreciated that the technical concept of the present invention is not limited thereto.

The 3D formatter 129 converts the combined image (overlaid image) into a 3D image data or a 3D image signal form that can be displayed by a 3D display panel. For example, when the format of the combined image is a top-down scheme and a 3D display panel provided in or connected to the device 100 for providing a 3D PIP image according to an embodiment of the present invention supports only a time division scheme, the 3D formatter 129 may convert the combined image based on the top-down scheme into a combined image based on the time division scheme. In this case, the 3D formatter 129 may convert a left image positioned at an upper end of the combined image into a left image frame and a right image positioned at a lower end into a right image frame.

Meanwhile, a 3D image frame displayed on an external 3D image display device or the display unit 135 of the device 100 for providing a 3D PIP image according to an embodiment of the present invention is configured as a pair of a left image and a right image corresponding to the same time point on a time axis. Thus, the device 100 for providing a 3D image must synchronize the left image and the right image to provide an accurate 3D image. To this end, the 3D formatter 129 may include the frame time comparing unit 129a, the frame correction unit 129b, a 3D format combining unit 129c, and the like.

The frame time comparing unit 129a analyzes a time relationship (e.g., a temporal preceding and subsequent (order) relationship) between the left image frame and the right image frame constituting the combined image from time information of the two frames. For example, the frame time comparing unit 129a may check time stamp information of the left image and the right image or may check time information of the left image and the right image based on the time information stored separately during the previously performed TS process.

The frame correction unit 129b combines the left image frame constituting the combined image and the right image frame temporally corresponding to the left image frame. Namely, the frame correction unit 129b may time-corrects the left image frame or the right image frame which is delayed or advanced to thereby output a combined image which has been temporally accurately paired.

To this end, the frame correction unit 129b may include a left image frame queue and a right image frame queue which receive and output image frames in a first-input-first output manner. In this case, the frame correction unit 129b may input an image frame which accurately corresponds to a predetermined point in time or a time-corrected image frame to the left image frame queue or the right image frame queue, and accordingly, a pair of frames simultaneously output from the left image frame queue and the right image frame queue are accurately paired. Namely, a left image frame and a right image frame whose time stamps are consistent are output.

The 3D format combining unit 129c merges the synchronized left image and right image of the combined image to generate 3D image data or a 3D image signal and output the same to the output data generating unit 131 or the display unit 135.

The output data generating unit 131 may receive the 3D image data output from the 3D formatter 129 and the audio bit stream output from the voice decoding units 117a and 117b, convert them into data formats appropriate to be output to the outside or data formats appropriate for the display unit 135 to display a 3D image, and provide the converted data formats to an external 3D image reproducing device 400, an external 3D image display device, or the display unit 135 through the output interface unit 133. For example, the external 3D image reproducing device 400 may be a 3D television, or the like.

Also, the output data generating unit 131 may combine (overlay0 the 3D image provided from the 3D formatter 129 and a different 2D image or a different 3D image provided through the input interface unit 141 from the external device 200.

The output interface unit 133 may include input/output ports such as a high definition multimedia interface (HDMI) port, a display port terminal, a digital visual interface (DVI) port, a video graphics array (VGA) ports, and the like, or wired or wireless network interfaces based on a local area network (LAN), a wireless LAN according to IEEE 802.11 a/b/g/n or the like, Bluetooth™, a universal serial bus (USB), IEEE 1394 (FireWire, i.Link), and the like.

When the device for providing a 3D PIP image according to an embodiment of the present invention does not include the speaker 121 or the display unit 135, video data or audio data with respect to a 3D combined image may be reproduced by the external 3D image reproducing device 400.

When the device for providing a 3D PIP image according to an embodiment of the present invention includes the speaker 121 or the display unit 135, video data and audio data with respect to a 3D combined image can be reproduced by the speaker 121 and the display unit 135, and in this case, the output data generating unit 131 or the output interface unit 133 may be omitted.

An image signal separating unit (not shown) may separate image data and a synchronization signal from the 3D image signal between the 3D formatter 129 and the display unit 135. The image data is information regarding brightness, chroma, and color of each pixel constituting a screen, which may be configured according to an image format such as RGB, CMYK, YCbCr (a color space used as part of a color image pipeline in a video and digital photograph system), YIQ (a color space of an NTSC color television system), HIS (hue, saturation and lightness), or the like. The synchronization signal is reference information or control information allowing a target image formed from the image data to be normally displayed. Namely, the synchronization signal prevents the target image from being shaken or broken. The synchronization signal includes a vertical synchronization signal (VSYNC), a horizontal synchronization signal (HSYNC), a pixel clock, a dot clock, or the like.

The display unit 135 includes a panel and a panel driving circuit for converting left and right image signals to be appropriately displayed on the panel and generating control signals such as various timing control signals, driving signals, and the like.

Meanwhile, the display unit 135 may include at least one of a liquid crystal display (LCD), a plasma display panel, a thin film transistor-liquid crystal display, an organic light-emitting diode, a field emission display, and a flexible display.

Also, two or more display units 135 may be provided according to an implementation form of the device 100 for providing a 3D PIP image. For example, both an upper display unit (not shown) and a lower display unit (not shown) may be provided to the device 100 for providing a 3D PIP image.

Also, the display unit 135 may display a 3D image according to a polarization scheme or a time-division scheme as a 3D image display scheme. The display unit 135 based on the polarization scheme may additionally include a polarization film or a polarizer. The display unit 135 based on the time-division scheme may additionally include a synchronization signal generator such as an emitter, or the like, for synchronizing left and right images with shuttered glasses.

The polarizer operates to pass light only in a particular polarization direction from the light emitted from the display unit 135 to allow the entirety of the transmitted light to have the same polarization direction. The polarizer may include at least one of an iodine polarization film, a dye-based polarization film, a phase polarization film, a translucent polarization film, a high reflective translucent polarization film, an anti-glare/anti-reflection film, a reflective polarization film, and a liquid crystal (LC) film. The polarizer is able to change a polarization direction into a particular direction according to an electrical control signal. For example, the polarizer may change into a polarization direction of −45° and a polarization direction of +45°, and in this case, light having the polarization direction of +45° are alternately transmitted through the polarizer.

The user interface (UI) unit 137 may provide various manipulation commands or information input by the user to the controller 139. The UI unit 137 may include a wireless receiving unit receiving an infrared signal or an RF signal transmitted from a remote controller, a keypad provided on a front surface or a side surface of the device 100 for providing a 3D PIP image according to an embodiment of the present invention, a receiving unit receiving a radio signal transmitted from a pointing device supporting an operation of moving a pointer on a screen and selecting a position at which the pointer is placed, and the like. For example, when the user selects to display a 2D PIP image or selects to display a 3D IP image by using a remote controller, the UI unit 137 may provide a corresponding selection command to the controller 139, and the controller 139 may transmit a control command to the PIP combining unit 127 to combine the 2D PIP image or the 3D PIP image.

The controller 139 may control an overall operation of the device 100 for providing a 3D PIP image. The controller 139 may receive a user input signal from the UI unit 137 and generate a control signal for controlling an operation of the device 100 for providing a 3D PIP image in response to the user input signal. For example, the controller 139 may generate a control signal including a reproduction, stop, multiplication command, or the like, with respect to the image decoding units 119a, 119b. Also, for example, the controller 139 may generate a control signal including output data resolution, interface mode control command, and the like, with respect to the output data generating unit 131.

The controller 139 and the 3D formatter 129 may be implemented as a single block or a single element that generates 3D image data or a 3D image signal and controls an overall operation of the device 100 for providing a 3D PIP image according to an embodiment of the present invention. For example, the controller 139 and the 3D formatter 129 may be implemented as a single microprocessor.

The functions of the respective components applied to the device 100 for providing a 3D PIP image can be implemented in a computer-readable recording medium by using software, hardware, or a combination thereof. For hardware implementation, the data transmission apparatus according to an embodiment of the present invention described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units, or a combination thereof. For software implementation, the data transmission apparatus according to an embodiment of the present invention may be implemented by at least one software module performing the foregoing functions or operations. Each software module may be implemented by software codes written in any suitable programming language. The software codes may be stored in a memory (not shown) and executed by a processor (processor).

FIG. 12 is a flow chart illustrating a method for providing a 3D PIP image according to an embodiment of the present invention. All of the constituent components of the method for providing a 3D PIP image illustrated in FIG. 12 are not essential, and the method for providing a 3D PIP image may be implemented by greater or fewer components.

With reference to FIG. 12, first, it is determined whether or not a PIP image included in an MVC file is a 2D image or a 3D image (S510, S520). When the PIP image is a 3D image, it is determined whether or not the user selects a 2D PIP image or a 3D PIP image (S530).

Next, when the PIP image is a 2D image, the PIP image is overlaid on a left image and a right image of a main image (S540). When the PIP image is a 3D image and the user selects the 2D PIP image, any one of a left image or a right image of the PIP image is overlaid on the left image and the right image of the main image (S550). When the PIP image is a 3D image and the user selects the 3D PIP image, the left image and the right image of the PIP image are overlaid on the left image and the right image of the main image, respectively (S560).

Finally, the combined image generated through the overlaying is provided to a 3D image reproducing device or a display unit (S570).

A method for providing a 3D PIP image according to an embodiment of the present invention can be understood in a similar manner to that of the device for providing a 3D PIP image according to an embodiment of the present invention as described above with reference to FIGS. 1 through 11, so a description thereof will be omitted.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

The invention claimed is:

1. A device for providing a three-dimensional (3D) picture-in-picture (PIP) image, the device comprising:
   an image acquisition unit for acquiring a 3D main image and a two-dimensional (2D) or 3D PIP image from a broadcast signal, an external device, or a recording medium;
   a PIP combining unit for combining the 3D main image and the PIP image; and
   a 3D formatter for formatting the combined image of the 3D main image and the PIP image into a format that can be stereoscopically displayed,
   wherein, for image encoding and image decoding,
   the 3D main image refers to at least one preceding frame of a left image or a right image of the 3D main image in a main image reference group, and
   the PIP image refers to at least one preceding frame of a left image or a right image of the PIP image in a PIP image reference group,
   wherein the PIP combining unit includes:
      a frame time comparing unit for analyzing a time relationship between the 3D main image and the PIP image from time information of the two images, and
      a frame correction unit for combining the 3D main image and the PIP image temporally corresponding to the 3D main image,
      wherein the frame correction unit includes a 3D main image frame queue and a PIP image frame queue that receive and output image frames in a first-input-first-output manner,
      the frame correction unit inputs an image frame that corresponds to a predetermined point in time or a time-corrected image frame to the 3D main image frame queue or the PIP image frame queue, and simultaneously outputs a pair of image frames from the 3D main image frame queue and the PIP image frame queue, to synchronize the pair of image frames.

2. The device of claim 1, wherein the 3D main image and the PIP image are included in a single media file according to multi-view video coding.

3. The device of claim 1, wherein the 3D main image and the PIP image are different programs included in a single transport stream.

4. The device of claim 1, wherein the PIP combining unit combines a left image and a right image of the 3D PIP image to a left image and a right image of the 3D main image, respectively.

5. The device of claim 1, wherein the PIP combining unit combines any one of the left image and the right image of the 3D PIP image to a left image and right image of the 3D main image.

6. The device of claim 1, wherein the PIP combining unit combines the 2D PIP image into the left image and the right image of the 3D main image.

7. The device of claim 1, wherein the 3D formatter comprises:
   a frame time comparing unit for analyzing a time relationship between two images from time information of a left image and a right image constituting a combined image of the 3D main image and the PIP image; and
   a frame correction unit for synchronizing the left image and the right image temporally corresponding to the left image.

8. The device of claim 1, further comprising:
   a PIP image determining unit for reading configuration information included in the broadcast signal, configuration information provided from the external device, and configuration information stored in the recording medium, and for determining whether or not the PIP image is a 3D image or a 2D image.

9. The device of claim 1, further comprising:
   a user input unit for receiving whether to display the 3D PIP image as a 3D image or a 2D image.

10. The device of claim 1, further comprising:
    an output interface unit for outputting the combined image of the 3D main image and the PIP image to a 3D image display device.

11. The device of claim 1, further comprising:
    a display unit for displaying the combined image of the 3D main image and the PIP image in a stereoscopic manner.

12. A three-dimensional (3D) Blu-rayDisc player comprising:
    an optical drive for reading a transport stream stored in a 3D Blu-ray disc;
    a transport stream analyzing unit for demultiplexing a main image program included in the transport stream and a picture-in-picture (PIP) image program, and for decoding a video bit stream and an audio bit stream of the main image and the PIP image;
    a PIP combining unit for overlaying the main image and the PIP image into a single combined image;
    a 3D formatter for formatting the combined image into a format that can be stereoscopically displayed; and
    an output interface unit for outputting the formatted combined image to a 3D image display device,
    wherein, for image encoding and image decoding,
    the main image refers to at least one preceding frame of a left image or a right image of the main image in a main image reference group, and the PIP image refers to at least one preceding frame of a left image or a right image of the PIP image in a PIP image reference group,
wherein the PIP combining unit includes:
a frame time comparing unit for analyzing a time relationship between the 3D main image and the PIP image from time information of the two images, and
a frame correction unit for combining the 3D main image and the PIP image temporally corresponding to the 3D main image,
wherein the frame correction unit includes a 3D main image frame queue and a PIP image frame queue that receive and output image frames in a first-input-first-output manner,
the frame correction unit inputs an image frame that corresponds to a predetermined point in time or a time-corrected image frame to the 3D main image frame queue or the PIP image frame queue, and simultaneously outputs a pair of image frames from the 3D main image frame queue and the PIP image frame queue, to synchronize the pair of image frames.

13. The 3D Blu-rayDisc player of claim 12, wherein the main image and the PIP image are stored in the form of a single media file in the 3D Blu-ray disc according to multi-view video coding.

14. The 3D Blu-rayDisc player of claim 12, wherein the PIP combining unit combines a left image and a right image of a 3D PIP image to a left image and a right image of a 3D main image, respectively, combines any one of the left image and the right image of the 3D PIP image to the left image and the right image of the 3D main image, or combines a 2D PIP image to the left image and the right image of the 3D main image.

15. A method for providing a three-dimensional (3D) picture-in-picture (PIP) image, the method comprising:
determining whether a PIP image is a two-dimensional (2D) image or a 3D image;
when the PIP image is a 3D image, determining whether a user has selected a 2D PIP or a 3D PIP;
combining a left image and a right image of a 3D PIP image to a left image and a right image of a 3D main image, respectively, combining any one of the left image and the right image of the 3D PIP image to the left image and the right image of the 3D main image, or combining a 2D PIP image to the left image and the right image of the 3D main image; and
providing the combined image of the 3D main image and the PIP image to a 3D image display device,
wherein, for image encoding and image decoding,
the 3D main image refers to at least one preceding frame of a left image or a right image of the 3D main image in a main image reference group, and
the PIP image refers to at least one preceding frame of a left image or a right image of the PIP image in a PIP image reference group,
wherein the combining of the 3D image and the PIP image includes:
analyzing a time relationship between the 3D main image and the PIP image from time information of the two images, and
combining the 3D main image and the PIP image temporally corresponding to the 3D main image,
wherein the combining of the 3D main image and the PIP image temporally corresponding to the 3D main image further includes:
inputting an image frame that corresponds to a predetermined point in time or a time-corrected image frame to a 3D main image frame queue or a PIP image frame queue, and
simultaneously outputting a pair of image frames from the 3D main image frame queue and the PIP image frame queue, to synchronize the pair of image frames,
wherein the 3D main image frame queue and the PIP image frame queue are received and output image frames in a first-input-first-output manner.

16. The method of claim 15, further comprising:
determining a three-dimensional (3D) picture-in-picture (PIP) image, the determining including:
reading a database file stored in a 3D Blu-ray Disc;
reading PIP image information included in the database file; and
determining whether a PIP image is a 3D image or a two-dimensional (2D) image based on the PIP image information.

17. The method of claim 16, wherein the database file is an index.bdmv file, and the PIP image information is stored in an ExtensionData region or a reserved_for_future_use region.

18. The method of claim 15,
wherein an image frame constituting the 3D main image does not refer to an image frame constituting the PIP image, and an image frame constituting the PIP image does not refer to an image frame constituting the 3D main image.

19. The method of claim 18, wherein the 3D main image and the PIP image are stored in a form of a single media file according to multi-view video coding.

* * * * *